United States Patent Office 2,938,053
Patented May 24, 1960

2,938,053

AMINO ACID ANALOGUES

Edward S. Blake, Dayton, Ohio, and Robert J. Wineman, Kirkwood, Mo., assignors to Monsanto Chemical Company, St. Louis, Mo., a corporation of Delaware No Drawing. Filed Dec. 29, 1955, Ser. No. 556,101

8 Claims. (Cl. 260—561)

This invention relates to the preparation of amino acid analogues and amino acid substitutes. In particular this invention relates to analogues of methionine and compositions having properties similar to methionine.

The synthesis of methionine from methylmercaptan and acrolein is well known and involves the preparation of methyl-mercapto-propionaldehyde which is reacted with hydrocyanic acid to form the 2-hydroxy-4-(methylthio) butyronitrile which is then aminated and hydrolyzed to methionine. In accordance with this invention it has been found that methionine analogues in some cases are as effective or more effective than methionine for many of its uses, particularly with respect to nutrition. Furthermore, the reaction of the 2-hydroxy-4-(methylthio) butyronitrile with ammonia is a difficult and costly procedure involving the use of high pressure apparatus.

Other methionine analogues differ considerably from the natural methionine in molecular structure and because of the unnatural configuration are not useful as animal or plant feed supplements. Many of these are absorbed by plant and animal structures and have toxic effects due to the inability of the organism to assimilate the analogue. By proper regulation of rates of application the toxic effect may be limited to parasitic life without being deleterious to the plant or animal host. Thus many of the new compounds are useful as fungicides, bactericides, virus control egents, anthelmintics and nematocides, through the antimetabolic action.

One purpose of this invention is to provide useful methionine analogues which are valuable as methionine substitutes. A further purpose is to provide a substitute for methionine which does not involve antimetabolates, a costly amination procedure. A still further purpose of this invention is to provide a means of preparing effective and inexpensive animal diets and particularly poultry feeds. Another purpose is to provide new compounds and methods for elimination or control of plant and animal parasites. Other purposes of the invention will be evident from the following description.

In accordance with this invention it has been found that the conventional procedure for preparing methionine may be modified by directly hydrolyzing the 2-hydroxy-4-(methylthio)butyronitrile to the corresponding amide without first aminating the hydroxyl group. The resulting amide, the 2-hydroxy-4(methylthio)butyric acid amide, has nutrient properties and also can readily be converted into the corresponding hydroxy analogue of methionine which has been shown to be more effective than methionine as a poultry nutrient.

It has been found that when (DL) methionine is used as a poultry feed, the fowl will assimilate substantially all of the (L) methionine and the (D) methionine is at least partially excreted. However, when the (DL) 2-hydroxy-4-(methylthio)butyric acid is used, the nutrient is more efficiently utilized. It is believed that the metabolism of the fowl is such that the hydroxy analogue of methionine is either directly assimilated or is converted to the amino acid form which is most readily assimilated by the fowl. This effect is also noticeable when salts and amides of 2-hydroxy-4-(methylthio)butyric acid are used as nutrients.

In accordance with this invention the 2-hydroxy-4-(methylthio)butyric acid amide synthesis may be initiated by reacting methylmercaptan with acrolein to form the 3-methylthio propionaldehyde which may, by reaction with hydrocyanic acid, be converted to the corresponding 2-hydroxy-4-(methylthio)butyronitrile or the synthesis may begin directly with the latter product. The critical part of the procedure is the hydrolysis of the nitrile to the amide and the alternative subsequent step by wihch the amide is hydrolyzed to the hydroxyl analogue of methionine.

In its broader aspects the inventive method may be used to prepare compounds having the structure

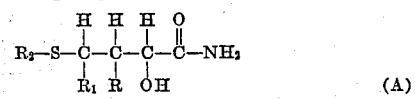
(A)

where R is hydrogen or methyl, $R_1$ is hydrogen or methyl and $R_2$ is hydrogen or alkyl group. Of preferred interest are the lower alkyl groups having up to four carbon atoms, but alkyl groups of up to twelve carbon atoms may be used also, under controlled conditions to form the corresponding amide or the free acid, depending on the conditions employed. These preparations involve the incomplete hydrolysis of the corresponding cyanohydrin having the structural formula

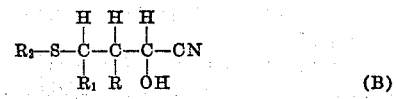
(B)

wherein the symbols represent the same substituents as in Formula A.

The 2-hydroxy-4-(methylthio)butyramide has nutrient values, but the other homologues in which either $R_1$ and/or $R_2$ are methyl and/or $R_2$ is greater than methyl result in compounds which more often have antimetabolitic activity than do they have nutrient value.

If desired the cyanohydrins may be prepared by reacting hydrocyanic acid or a reactive cyanide with an appropriate aldehyde. The cyanohydrins hereinbefore described are hydrolyzed in accordance with the processes of the present invention to form the corresponding free acid or the amide of the acid, depending on the conditions employed in carrying out the hydrolysis. In any event, the amide is formed first and may then be hydrolyzed to form the free acid, or alternatively the amide may be hydrolyzed directly to derivatives of the acid as will appear hereinafter. It has presently been found that when the cyanohydrin is treated with relatively concentrated solutions of a mineral acid selected from sulfuric acid or hydrohalic acids and at relatively low temperatures, that is, temperatures below about 75° C., the cyanohydrin is converted to the amide of the corresponding acid in high yields, that is, in yields of about 65 to 75%, based on the starting cyanohydrin, without any appreciable formation of the free acid.

In carrying out this embodiment of the present invention, the cyanohydrin, either in the crude or pure state, is treated or contacted with an aqueous solution of the mineral acid containing an amount of acid sufficient to dissolve the cyanohydrin at temperatures not in excess of 75° C., and preferably between about 20 and 50° C. When sulfuric acid solutions are employed, the solution preferably contains from 50–85% by weight of such acid. On the other hand, when hydrochloric acid solutions are used, the solution suitably contains about 25–40% by weight of such acid. The amount of acid solution employed may be such as to provide a molecular proportion of acid equivalent to the cyanohydrin, although a mol ratio of mineral acid to the cyanohydrin as high as 1.5:1 may be used. The ratio of the mineral acid to the cyanohydrin may be even higher than this, but there is no advantage in using more acid and the problem of removing the acid in subsequent steps is made considerably more difficult.

It has been presently found that very satisfactory hydrolysis of the cyanohydrin to the amide is unexpectedly obtained, when less than molecular equivalents of sulfuric acid and cyanohydrin are employed. Thus, it is possible to obtain high yields of the amide from the cyanohydrin even when the mol ratio of sulfuric acid to cyanohydrin is between 0.5:1 and 0.8:1. These low mol ratios of acid to cyanohydrin are particularly advantageous in those instances where the amide is hydrolyzed to the corresponding acid and thence converted to derivatives of such acid, since in such instances considerably smaller amounts of water-soluble impurities are formed from the sulfate ions present, and appreciably larger quantities of the desired product are recovered in separating such impurities from the product desired. This is of considerable advantage in commercial production since considerable economies in separating or recovering the desired product from water-soluble impurities are effected.

When sulfuric acid solutions are used for hydrolyzing the cyanohydrin to the amide at temperatures between about 55 and 75° C., the aqueous solution of the acid should preferably contain close to 50% by weight of sulfuric acid. On the other hand, aqueous sulfuric acid solutions which are employed at temperatures between about 20–50° C. preferably contain about 70–85% by weight of sulfuric acid.

For best results the aqueous solution of the mineral acid should be added to the cyanohydrin in small portions, either continuously or intermittently, and over a period of from about 30 to 180 minutes. However, it is possible to contact the cyanohydrin initially with all of the aqueous solution of the mineral acid if care is taken to maintain the temperature of the resulting mixture below 75° C., and preferably between about 20 and 50° C.

The hydrolysis of the cyanohydrin to the amide of the corresponding free acid is usually completed within a period of 10 to 180 minutes depending on the specific conditions used in carrying out the hydrolysis. Generally, shorter hydrolysis periods are required, for example, when the water-sulfuric acid hydrolyzing mixture contains from 70 to 85% by weight of sulfuric acid and when temperatures close to 60–75° C. are employed. However, under such conditions there is some loss in yield. Longer hydrolysis periods are required, for example, when the water-sulfuric acid hydrolyzing mixture contains about 50% by weight of sulfuric acid and temperatures of 20–50° C. are employed.

If desired, the amide may be separated or recovered from the hydrolysis mixture at this stage, or the amide may be converted to the corresponding free acid or to derivatives of such acid without separating the amide from the hydrolysis mixture. If it is desired to recover the amide per se, the procedure used varies depending primarily on the mineral acid employed, the concentration of the water-mineral acid mixture and the temperature of the hydrolysis mixture. Since the amide is insoluble in water-sulfuric acid mixtures containing from about 70–85% by weight of sulfuric acid and at temperatures between about 25 and 75° C., it is usually necessary in such cases to dilute the hydrolysis mixture with water to cause separation of the amide in the form of crystals. The amount of water added may be varied considerably. Usually dilution with water until the water-sulfuric acid mixture contains from about 20–40% by weight of sulfuric acid or less is sufficient to cause precipitation of a considerable amount of the amide. Cooling the hydrolysis mixture to temperatures below 20° C., for example, between 5 and 15° C. also aids in the precipitation of the amide. If the hydrolysis mixture is cooled and diluted with water, a substantial portion of the amide in the hydrolysis mixture is readily precipitated in the form of crystals. The crystals are readily separated from the mother liquor by filtration, centrifugation, decantation or the like.

When the hydrolysis of the cyanohydrin to the amide is carried out in a water-sulfuric acid mixture containing about 50% by weight of sulfuric acid, it is not essential to dilute the mixture with water since some of the amide will precipitate on cooling the solution below the operating temperature. However, in order to precipitate a substantial portion of the amide from solution both dilution and water and cooling are essential.

In order to separate the amide which remains in solution in the mother liquor, the mother liquor may be treated with a metallic base or salt which is capable of forming a water-insoluble salt with the anion of the hydrolyzing mineral acid in the liquor. For example, when the hydrolyzing acid is sulfuric acid, calcium carbonate or calcium hydroxide or any of the alkali earth metal carbonates or hydroxides are useful for the purpose of forming the corresponding water-insoluble alkali earth metal sulfate in the mother liquor. The water-insoluble sulfate is removed by filtration or in any convenient manner. The mother liquor is next concentrated and the residue is taken up in a suitable solvent and the amide therein is crystallized from the resulting solution. For example, in the case of 2-hydroxy-4-(methylthio)butyramide, the residue may be taken up in hot acetone and the amide crystallized therefrom. The amides generally crystallize from water and are generally soluble in hot acetone.

The amides produced in accordance with the procedure described above are new chemical compounds and have the general formula:

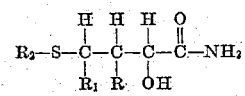

where R, $R_1$ and $R_2$ have the same significance as in the general formula for the cyanohydrin hereinbefore given. The (DL) form of the amide is obtained as a result of the processes described herein.

The amide may be hydrolyzed to the corresponding free acid or directly to derivatives of such acid as has been pointed out above. In those instances where the free acid or certain derivatives thereof are described, it is preferred to first form the amide from the cyanohydrin as hereinbefore described. For example, after the amide has been formed from the cyanohydrin by the use of relatively concentrated aqueous sulfuric or hydrochloric acid solutions and relatively low temperatures, as hereinbefore described, the hydrolysis mixture is diluted with water until the mixture contains from about 5 to 40% by weight, preferably between about 10 and 20% by weight, of the hydrolyzing acid. The dilution water is desirably added to the hydrolysis mixture containing the amide at a rate sufficient to maintain the temperature of the mixture below about 75° C., and preferably between 20 and 50° C. The temperature of the mixture is then raised above 60° C., and preferably from 80° C. to the boiling point of the mixture at atmospheric pressure, for a period of time sufficient to complete the hydrolysis of the amide to the corresponding free acid. This usually requires from about 30 minutes to about 5 hours depending primarily on the concentration of the acid in the hydrolysis mixture and the temperature of the mixture. If desired, heating of the hydrolysis mixture may be started while the dilution water is being added if care is taken to maintain the mixture below 75° C. until dilution of the original amide-hydrolyzing acid mixture is complete.

In order to obtain a relatively pure hydrolysis product, it is desirable to distill off some of the water present in the hydrolysis mixture during the hydrolysis of the amide to the corresponding free acid. In this manner some of the impurities which are steam distillable, including hydrogen cyanide, are removed from the hydrolysis mixture. Satisfactory results are obtained in this respect by distilling off about 5 to 15% by weight of the water calculated on the weight of the hydrolysis mixture. The time required for carrying out the removal of water in this manner varies to some extent depending on the volume of liquid present and the heat transfer surface available, but is usually between about 30 and 90 minutes.

The mixture obtained by the hydrolysis step described above contains the free acid (hereinafter sometimes referred to as the substituted butyric acid), that is, a compound having the general formula:

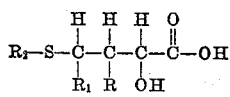

where R, $R_1$ and $R_2$ have the same significance as in the general formula for the cyanohydrin hereinbefore given; and also contains the ammonium salt of the hydrolyzing acid, for example, ammonium sulfate or ammonium chloride, and minor amounts of impurities. The substituted butyric acid is obtained as the (DL) form and may be prepared from the mixture by extraction with a suitable water-immiscible organic liquid which is a solvent for the acid, for example, an organic liquid such as diethyl ether. The organic liquid may then be separated by evaporation or distillation and the acid is recovered as a substantially pure product.

Various derivatives of the substituted butyric acid may be made from the hydrolysis mixture containing such acid, or from the acid per se. For example, it is possible to prepare a solution of the ammonium salt of the acid by adding an alkali earth metal hydroxide or carbonate, such as calcium hydroxide or carbonate, to the hydrolysis mixture in an amount sufficient to react with the ammonium sulfate in the mixture (when sulfuric acid is used as the hydrolyzing acid) to form insoluble calcium sulfate and thus liberate ammonia which then reacts with the substituted butyric acid to form the salt. The alkali earth metal sulfate is then removed from the solution by filtration or some equivalent operation. It is preferred, however, to dilute the hydrolysis mixture with water until it contains between about 3 and 8% by weight of the hydrolyzing acid prior to the addition of the alkali earth metal hydroxide or carbonate. Moreover, it is also preferred to heat the hydrolysis mixture to a temperature of about 45 to 65° C. prior to the addition of such hydroxide or carbonate. Normally, the pH of the mixture after the addition of the required amount of hydroxide or carbonate will be between about 5.4 and 5.9. After removal of the insoluble alkali earth metal sulfate from the hydrolysis mixture, the water may be removed from the mixture by evaporation, leaving a residue which consists substantially of the ammonium salt. A purer ammonium salt may be prepared by reacting the substituted butyric acid per se with ammonia or ammonium hydroxide. In general, the ammonium salts of the substituted butyric acids described herein are obtained as viscous liquids or hygroscopic solids depending on the temperature and the amount of water contained therein.

By adding an excess of the alkali earth metal hydroxide or carbonate to the hydrolysis mixture it is possible to form a mixture of ammonium and alkali earth metal salts of the substituted butyric acid, or the alkali earth metal salt of the acid depending on the quantity of such hydroxide or carbonate used. In carrying out this procedure it is preferred to employ calcium hydroxide since the only by-products present in the final mixture are calcium hydroxide and ammonium hydroxide. The calcium hydroxide, being only slightly water-soluble, may be removed by filtration or in some equivalent manner, while the ammonium hydroxide may be decomposed to ammonia and water by heating the mixture, thus driving off the ammonia as a gas. The final mixture thus consists substantially of a mixture of ammonium and calcium salts of the substituted butyric acid, or the calcium salt of the acid. The salts may then be recovered by evaporating off the water. Before adding the excess of alkali metal hydroxide or carbonate, it is preferred to heat the solution containing the ammonium salt of the substituted butyric acid to a temperature of about 45 to 65° C., and after such hydroxide or carbonate has been added it is preferred to heat the solution or mixture to a temperature of about 90° C. to the boiling point to drive off the ammonia present in the solution.

The mixtures of ammonium and alkali earth metal salts of the substituted butyric acid may also be prepared by reacting the ammonium salt of the acid per se with an amount of alkali earth metal hydroxide which is insufficient to form the alkali earth metal salt per se. The ammonium hydroxide formed may then be removed as described above. The alkali earth metal salt of the substituted butyric acid may be prepared by reacting either the acid per se or the ammonium salt of the acid with an alkali earth metal hydroxide using an amount of hydroxide in excess of the stoichiometric quantity.

EXAMPLE 1

A. *Preparation of 2-hydroxy-4-(methylthio)butyronitrile*

One hundred and sixty-six and four tenths grams of 3-(methylthio)propionaldehyde were placed in a flask and shaken for 10 minutes with a solution of 152 grams of sodium meta bisulfite in 576 ml. of water. The temperature of this mixture was maintained below 35° C. Seventy-eight and four tenths grams of sodium cyanide were added in portions to the solution and the temperature was maintained between 25 and 35° C. during this addition. An oil phase separated out as an upper layer and this was separated from the lower aqueous layer. The aqueous layer was then extracted with benzene and the resulting benzene extracts were combined with the separated oil layer. The benzene-oil solution was dried over anhydrous sodium sulfate, and subjected to vacuum distillation at a heating bath temperature of 40° C. to remove the benzene. The residue totaled 200.4 grams. The yield of 2-hydroxy-4-(methylthio)butyronitrile was 95% based on the starting 3-(methylthio)propionaldehyde.

B. *Preparation of 2-hydroxy-4-(methylthio)butyramide*

One hundred and ninety-nine grams of the crude nitrile prepared as described immediately above were placed in a flask and to this mixture, 27 grams of water and 152 grams of 98% sulfuric acid was added dropwise and with stirring. The temperature was maintained at about 35° C. during this addition. After all of the acid and water mixture was added, the mixture was agitated for 10 minutes, after which 316 ml. of water were added to the mixture as rapidly as possible consistent with keeping the temperature below 35° C. After all of this water was added, the resulting solution was cooled to a temperature of 5 to 10° C. whereupon the amide crystallized in the form of colorless nacreous plates. The resulting mixture was filtered to remove the crystals. The crystals were washed with 100 parts water, dried at room temperature under vacuum and then dried at about 65° C. One hundred and eleven parts of dry crystals were thus obtained. The crystals melted at 98 to 100° C.

The filtrate obtained after removal of the crystals was diluted with 316 ml. of water and neutralized by the addition of 160 grams of calcium carbonate with stirring. The calcium carbonate reacted with the sulfuric acid in the filtrate to form CaSO₄ which precipitated from the solution and was removed together with excess calcium carbonate by filtration. The filtrate was concentrated under vacuum at a heating bath temperature of 35° C. to a weight of 150 grams. This concentrated liquid was next taken up in 300 ml. of boiling acetone, filtered hot and then allowed to cool. On cooling the amide crystallized and was separated by filtration and dried. Thirty-three and eight tenths grams of the product were thus obtained. The dry crystals melted at a temperature of 97 to 100° C. A third crop of 10 grams of crystals were obtained in the same manner by further evaporation of the acetone solution. The total yield of product, which on analysis proved to be the 2-hydroxy-4-(methylthio)butyramide, was 155 grams. This represents a yield of 68% based on the starting 3-(methylthio)propionaldehyde.

EXAMPLE 2

A. Preparation of 2-hydroxy-4-(methylthio)butyronitrile

One hundred and fifty-six and seven tenths grams of 3-(methylthio)propionaldehyde and 0.45 gram of pyridine (as a catalyst) were placed in a flask and 45 grams of liquid hydrogen cyanide (96% pure) were added dropwise to the flask over a period of one hour with stirring. The temperature of the ingredients in the flask was maintained between 30 and 40° C. during this addition. After all of the hydrogen cyanide was added, the mixture was stirred for one hour at atmospheric pressure and room temperature. Vacuum was then applied to the flask until all of the excess hydrogen cyanide was removed.

B. Preparation of 2-hydroxy-4-(methylthio)butyramide

A mixture of 162 grams of 98% sulfuric acid and 53.7 grams of water was added to the nitrile, prepared as described immediately above, over a period of 2 hours and the temperature of the resulting mixture was maintained between 30 and 35° C. The mixture was stirred for 10 minutes, after which 323 grams of water were added over a period of about 5 minutes with stirring. This mixture was divided into two portions, one of which weighed 362.5 grams. This latter portion was cooled in an ice bath and the amide therein was allowed to crystallize. The amide crystallized in the form of colorless, nacreous plates which were separated from the mother liquor by filtration and washed with 50 ml. of water to give 77 grams of damp cake. The damp cake was first dried at room temperature under vacuum and then dried at 65° C. to a constant weight of 68.4 grams. The dry crystals melted at 95 to 98° C.

The filtrate from the above procedure was treated with 100 ml. of water and then with 88 grams of calcium carbonate with rapid stirring, the carbonate being added in portions so that the temperature of the mixture was maintained below 35° C. The precipitated calcium sulfate and excess calcium carbonate were filtered off and the cake was washed with 100 ml. of water. The filtrate and washings were combined and concentrated under a vacuum at a heating bath temperature of 40° C. to a weight of 53 grams. This residue was taken up in 100 ml. of hot acetone, filtered to remove inorganic matter, and the filtrate was allowed to evaporate to a volume of 30 ml. The crystals which formed were filtered off, washed with cold acetone and dried to give 11.7 grams of less pure product. The total yield of (DL) 2-hydroxy-4-(methylthio)butyramide was 80.1 grams, which is a 73% yield based on the starting 3-(methylthio)propionaldehyde. On recrystallization from hot acetone, the amide melted at 97 to 98.5° C. Calculated on the basis of the formula $C_5H_{11}O_2NS$; C=40.25%, H=7.73%, N=9.39%, S=21.49% and O=21.16%. Found by analysis: C=40.25%, H=7.47%, N=9.4%, S=21.39%, and O=21.47% (by difference).

The remaining 373.8 grams of hydrolysis mixture were converted to the mixed calcium and ammonium salts of 2-hydroxy-4-(methylthio)butyric acid as described in the following example.

EXAMPLE 3

2-hydroxy-4-(methylthio)butyronitrile was prepared from 104.2 grams of 3-(methylthio)propionaldehyde using the procedure described in the first paragraph of Example 2. After all of the excess hydrogen cyanide was removed from the reaction mixture, a mixture of 110 grams of 98% sulfuric acid and 36 grams of water were added dropwise to the mixture over a period of 1.5 hours with stirring and at a temperature of 30 to 35° C. The mixture was stirred for 10 minutes, after which 514 ml. of water were added over a period of 3 to 4 minutes. The temperature of the mixture was raised to the boiling point over a period of 40 minutes, after which the mixture was refluxed (about 100° C.) with stirring for one hour. The resulting mixture consisted primarily of 2-hydroxy-4-(methylthio)butyric acid, water and ammonium sulfate. After cooling, the 798 grams of reaction mixture was divided into two equal portions (designated A and B) of 399 grams each.

Portion A was diluted with 600 ml. of water and the sulfuric acid therein was neutralized by the addition of a slurry of 40.8 grams of calcium hydroxide in 250 ml. of water over a period of 1.5 hours. The mixture was stirred for 45 minutes and the calcium sulfate which had precipitated was removed by filtration and washed with 140 ml. of water. The combined filtrate and washings (totaling 1266 grams) were then added to a stirred slurry of 18.5 grams of calcium hydroxide in 250 ml. of water. The mixture was next stirred for 11.5 hours and the suspended material, which was largely calcium sulfate, was removed by filtration. The filtrate was concentrated to dryness under vacuum at a heating bath temperature of 40 to 45° C. A cream colored solid was recovered which was then dried further, ground and screened. The yield of product was 87 grams. Analyses for sulfide, sulfur, ammonia nitrogen, calcium and water indicated that the composition of this material is 26.1% ammonium salt of (DL) 2-hydroxy-4-(methylthio)butyric acid, 66.6% of the calcium salt of the same acid, 3.72% water and 3.2% calcium sulfate. The percent yield of total salts of 2-hydroxy-4-(methylthio)butyric acid calculated on the sulfide sulfur analysis is 95.4% based on the starting 3-(methylthio)propionaldehyde.

Portion B of the filtrate was diluted with 600 ml. of water and the sulfuric acid in the mixture was neutralized by adding, with stirring, a suspension of 55 grams of calcium carbonate in 250 ml. of water. The precipitated calcium sulfate was filtered off and the filter cake was washed with 140 ml. of water. The combined filtrate and washings were stirred and a suspension of 18.5 grams of calcium hydroxide in 250 ml. was added thereto. After stirring for 16 hours, the suspended material (which was largely calcium sulfate) was filtered off and the filtrate was concentrated to dryness to give 91.5 grams of a cream colored product. An analysis indicated that this product consisted of 67% of the calcium salt of 2-hydroxy-4-(methylthio)butyric acid, 22% of the ammonium salt of the same acid, 7.1% water and 3.4% calcium sulfate. The yield of total salts of the butyric acid was 96.4% based on the starting 3-(methylthio)propionaldehyde.

EXAMPLE 4

A. Preparation of 2-hydroxy-4-methylthio(butyric acid)

One hundred and thirty one grams of 2-hydroxy-4-(methylthio)butyronitrile were charged to a glass lined vessel and 72 grams of an aqueous sulfuric acid solution containing 75% $H_2SO_4$ were added slowly with stirring over a period of 30 minutes, while maintaining the resulting mixture between 30 and 50° C. The amount of acid thus supplied was about 0.55 mol per mol of the nitrile. Stirring was continued for about 15 minutes after all of the acid solution was added, during which time substantially all of the nitrile was hydrolyzed to 2-hydroxy-4-(methylthio)butyramide, and then sufficient water was added to provide a mixture containing about 14.2% of sulfuric acid while maintaining the temperature at 50° C. After all of the water was added the mixture was heated to the boiling temperature of the mixture (about 106° C.) at atmospheric pressure and water was distilled off from the mixture at a rate such as to remove 11% of the water from the mixture over a period of 60 minutes. During this operation the amide in the mixture was hydrolyzed to the corresponding acid (2-hydroxy-4-[methylthio]butyric acid) and ammonium sulfate was also formed, and the steam distillable impurities, including hydrogen cyanide, were removed from the mixture during the distillation of the water. The hydrolysis mixture was then cooled down to about 20 to 30° C. At this stage the mixture contained about 15 to 16% of sulfuric acid, and the mixture was then diluted with water until it contained about 5.7% sulfuric acid.

B. *Preparation of calcium salt of 2-hydroxy-4-(methylthio)butyric acid*

The mixture obtained as a result of the procedure of the preceding paragraph was heated to a temperature of about 55° C. and calcium carbonate was then added in an amount sufficient to react with all of the ammonium sulfate in the mixture. As a result of this procedure the ammonium salt of the 2-hydroxy-4-(methylthio)butyric acid was formed together with calcium sulfate. The pH of the mixture at this stage was about 5.5. The insoluble calcium sulfate was then separated from the liquid by centrifugation and the cake of calcium sulfate thus obtained was washed to remove the ammonium salt of the acid occluded therein. The washings were combined with the liquid obtained by centrifugation and the resulting mixture was then heated to 55° C., after which calcium hydroxide was added in an amount sufficient to form the calcium salt of the butyric acid plus a slight excess. By this procedure the calcium salt of 2-hydroxy-4-(methylthio)butyric acid and ammonium hydroxide were formed. The mixture was then heated to 95° C. for about 60 minutes to decompose the ammonium hydroxide and to drive off ammonia. The resulting mixture was then diluted with water until it contained about 10% by weight of such calcium salt and was then filtered to remove residual calcium sulfate and calcium hydroxide. The resulting solution was then concentrated by evaporation of water until a concentrated slurry of the calcium salt of the butyric acid was obtained. This slurry was then filtered and the filter cake, which consisted substantially of the calcium salt, was dried. The mother liquor was combined with subsequent slurries of the calcium salt. The composition of the dry cake was as follows: 97% calcium salt of (DL) 2-hydroxy-4-(methylthio)butyric acid, about 1.5% of the ammonium salt of the same acid, about 1% of water and the balance essentially calcium sulfate.

EXAMPLE 5

*Preparation of 2-hydroxy-4-(ethylthio)butyronitrile*

A solution of 380 grams of sodium metabisulfite in 144 ml. of water was charged with 47.2 grams of 3-(ethylthio)propionaldehyde. The reagent mixture formed a cloudy solution, and was extracted with 20 ml. of benzene to remove the undissolved sodium bisulfite. The mixture of reagents was stirred in an ice bath with a solution of 2.4 grams of sodium cyanide in 60 ml. of water, which solution was slowly added while maintaining the temperature between 25 to 35° C. A colorless light oil separated during the reaction and was removed from the aqueous phase. After drying the oil at room temperature under vacuum, a substantially quantitative yield of crude 2-hydroxy-4-(ethylthio)butyronitrile was obtained.

EXAMPLE 6

*The preparation of 2-hydroxy-4-(ethylthio)butyramide*

The 2-hydroxy-4-(ethylthio)butyronitrile prepared in the previous example was placed in a 500 ml. three-necked flask, provided with a dropping funnel, a mechanical stirring device and a thermometer. With continuous agitation, the flask was charged with 32 grams of 75% sulfuric acid over a period of 35 minutes, during which time the temperature was maintained between 40-50° C. When all of the reagents had been combined, the agitation was continued for 10 minutes and 105 ml. of water were added. The compound which precipitated was identified as 2-hydroxy-4-(ethylthio)butyramide.

EXAMPLE 7

A slurry of the amide formed in Example 6 was heated at reflux temperature and maintained at approximately 107° C. for one hour, during which time a small quantity of distillate was collected and discarded. At this time the reaction mixture was present as two liquid phases. The oil phase was separated and the aqueous phase was saturated with sodium sulfate producing an additional quantity of the oil phase. The aqueous phase was then extracted once with 40 ml. of chloroform. The oil phase and the chloroform extract were combined and dried over sodium sulfate. The small amount of discolorizing charcoal was mixed with the reaction product, the mixture filtered to remove the charcoal and heated under vacuum to remove the chloroform. The residue was identified as 2-hydroxy-4-(ethylthio)butyric acid.

EXAMPLE 8

*The preparation of calcium 2-hydroxy-4-(ethylthio) butyrate*

A proportion of the acid prepared in accordance with the preceding example was dissolved in 10 ml. of water and mixed with a slurry of 2.3 grams of calcium hydroxide in 20 ml. of water. The resulting mixture was dried at 105° C. to form the calcium 2-hydroxy-4-(ethylthio)butyrate.

EXAMPLE 9

*The preparation of 2-hydroxy-4-(isopropylthio) butyramide*

In accordance with the procedure described in Example 5, 3-(isopropylthio)propionaldehyde was converted to 2-hydroxy-4-(isopropylthio)butyronitrile. This cyanohydrin (520.7 grams) was hydrolyzed gradually adding 261 grams of 75% sulfuric acid over a period of 90 minutes while maintaining the reaction temperature at 42-50° C. by periodic cooling. After adding 700 ml. of water and cooling, approximately 340 grams of a light oil was separated. The oil was purified by distillation (0.005 mm. of mercury). The resulting product was identified as 2-hydroxy-4-(isopropylthio) butyramide.

This application is a continuation-in-part of abandoned application Serial No. 193,276, filed October 1, 1950, and application Serial No. 317,828, filed October 30, 1952, and now issued as United States Patent 2,745,745.

What is claimed is:

1. A chemical compound having the following molecular structure

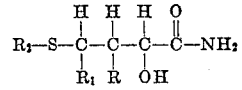

wherein R and $R_1$ are radicals selected from the group consisting of hydrogen and methyl and $R_2$ is an alkyl radical having one (1) to four (4) carbon atoms.

2. A chemical compound having the structure

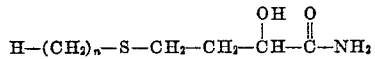

wherein $n$ is an integer from one (1) to two (2) inclusive.

3. The compound 2-hydroxy-4-(methylthio)butyramide.

4. The compound 2-hydroxy-4-(ethylthio)butyramide.

5. The method which comprises heating a cyanohydrin having the formula $$R_2-S-\underset{\underset{R_1}{|}}{\overset{\overset{H}{|}}{C}}-\underset{\underset{R}{|}}{\overset{\overset{H}{|}}{C}}-\underset{\underset{OH}{|}}{\overset{\overset{H}{|}}{C}}-CN$$

wherein R and $R_1$ are radicals selected from the group consisting of hydrogen and methyl and $R_2$ is an alkyl radical having one (1) to four (4) carbon atoms, in an aqueous solution containing an amount of mineral acid of the group consisting of hydrochloric acid and sulfuric acid sufficient to dissolve the cyanohydrin at a temperature below 75° C. and recovering an amide having the formula $$R_2-S-\underset{\underset{R_1}{|}}{\overset{\overset{H}{|}}{C}}-\underset{\underset{R}{|}}{\overset{\overset{H}{|}}{C}}-\underset{\underset{OH}{|}}{\overset{\overset{H}{|}}{C}}-\overset{\overset{O}{\|}}{C}-NH_2$$

wherein R and $R_1$ are radicals selected from the group consisting of hydrogen and methyl and $R_2$ is an alkyl radical.

6. A process which comprises heating cyanohydrin having the structure $$R_2-S-\underset{\underset{R_1}{|}}{\overset{\overset{H}{|}}{C}}-\underset{\underset{R}{|}}{\overset{\overset{H}{|}}{C}}-\underset{\underset{OH}{|}}{\overset{\overset{H}{|}}{C}}-CN$$

wherein R and $R_1$ are radicals selected from the group consisting of hydrogen and methyl and $R_2$ is an alkyl radical having one (1) to four (4) carbon atoms, in an aqueous solution containing from 50–85% by weight of sulfuric acid at a temperature below 75° C., said solution being present in an amount sufficient to provide about 0.5 to 0.8 mol of said sulfuric acid per mol of the cyanohydrin and recovering the product $$R_2-S-\underset{\underset{R_1}{|}}{\overset{\overset{H}{|}}{C}}-\underset{\underset{R}{|}}{\overset{\overset{H}{|}}{C}}-\underset{\underset{OH}{|}}{\overset{\overset{H}{|}}{C}}-\overset{\overset{O}{\|}}{C}-NH_2$$

wherein R and $R_1$ are radicals selected from the group consisting of hydrogen and methyl and $R_2$ is an alkyl radical.

7. The process which comprises heating 2-hydroxy-4-(methylthio)butyronitrile in an aqueous solution containing 50–85% by weight of sulfuric acid at a temperature of 20–50° C. until the nitrile is converted to 2-hydroxy-4-(methylthio)butyramide, said solution being present in an amount sufficient to provide from 0.5 to 0.8 mol of sulfuric acid per mol of nitrile, and recovering the amide so formed.

8. The process which comprises heating 2-hydroxy-4-(ethylthio)butyronitrile in an aqueous solution containing 50–85% by weight of sulfuric acid at a temperature of 20–50° C. until the nitrile is converted to 2-hydroxy-4-(ethylthio)butyramide, said solution being present in an amount sufficient to provide from 0.5 to 0.8 mol of sulfuric acid per mol of nitrile, and recovering the amide so formed.

References Cited in the file of this patent

UNITED STATES PATENTS

| | | |
|---|---|---|
| 2,229,897 | Migrdichian | Jan. 28, 1941 |
| 2,542,768 | Gresham et al. | Feb. 20, 1951 |
| 2,745,745 | Blake et al. | May 15, 1956 |
| 2,812,345 | Westfahl | Nov. 5, 1957 |

OTHER REFERENCES

Bird: C.A., vol. 47, pp. 7612–13 (1953).

Degering: An Outline of Organic Nitrogen Compounds, 1945, p. 508.

Akobe: Chem. Abstracts, vol. 31, col. 736 (1937).